United States Patent [19]

Henry

[11] 4,219,275

[45] Aug. 26, 1980

[54] RING LASER HAVING MAGNETIC ISOLATION OF COUNTER-PROPAGATING LIGHT WAVES

[75] Inventor: Rodney D. Henry, Saratoga, Calif.

[73] Assignee: Rockwell International Corporation, El Segundo, Calif.

[21] Appl. No.: 918,305

[22] Filed: Jun. 22, 1978

[51] Int. Cl.² .......................... G01B 9/02; G01P 9/00
[52] U.S. Cl. .................................... 356/350; 356/351
[58] Field of Search ............................... 356/350, 351

[56] References Cited

U.S. PATENT DOCUMENTS

| | | | |
|---|---|---|---|
| 3,757,247 | 9/1973 | Giallorenzi et al. | 356/350 |
| 3,826,575 | 7/1974 | Walter, Jr. | 356/350 |
| 3,854,819 | 12/1974 | Andringa | 356/350 |
| 3,862,803 | 1/1975 | Yntema et al. | 356/350 |
| 3,892,486 | 7/1975 | Ferrar | 356/350 |

FOREIGN PATENT DOCUMENTS 2044575  3/1972  Fed. Rep. of Germany ........... 356/350

OTHER PUBLICATIONS

"Unidirectional Unstable Ring Lasers" Freiberg et al.; Applied Optics vol. 12 #6 Jun. 1973; pp. 1140–1144.
"Fabrication of Thin Film Magnetic Garnet Structures for Intra-Cavity Laser Applications"; Whitcomb et al.; Nov. 1977; 23rd Conference on Magnetism and Magnetic Materials pp. 1–3.

*Primary Examiner*—Vincent P. McGraw
*Attorney, Agent, or Firm*—H. Fredrick Hamann; Gilbert H. Friedman

[57] ABSTRACT

A ring laser having a nonreciprocal loss element positioned in the aperture of the optical cavity of the laser. The nonreciprocal loss element is adapted to isolate a pair of plane-polarized counter-propagating light waves from each other. The isolation reduces the coupling between the waves and thereby reduces the extent of nonlinear mode locking which typically occurs in ring laser gyroscopes when the difference in frequency between the light in the two waves is small. The isolation is the result of either a spatial or a temporal separation between the counter-propagating light waves. The nonreciprocal loss element of the preferred embodiments comprises a first optical element having reciprocal optical activity and a second optical element having either reversed or reversible nonreciprocal optical activity. The nonreciprocal loss element tends to extinguish either the clockwise or the counterclockwise propagating one of the pair of light waves depending on the direction of magnetization in the nonreciprocal optically active element. In a preferred embodiment, the nonreciprocal optically active element is a film of ferrimagnetic material having a domain wall, or magnetization reversal, so positioned in the aperture of the optical cavity that two regions of the film having opposite magnetizations each occupy approximately half the aperture. Thus, a counterclockwise propagating light wave passing through the region of the film having one magnetization occupies a different portion of the aperture than is occupied by a clockwise propagating light wave passing through the region of the film having the other, opposite, magnetization. In another preferred embodiment, the magnetization of the film is modulated cyclically from magnetic saturation in one direction to magnetic saturation in the opposite direction by an externally applied magnetic field. Only one light wave at a time is thereby permitted to propagate. The counter-propagating light waves are thus alternately turned on and extinguished so that they do not exist at the same time.

22 Claims, 4 Drawing Figures

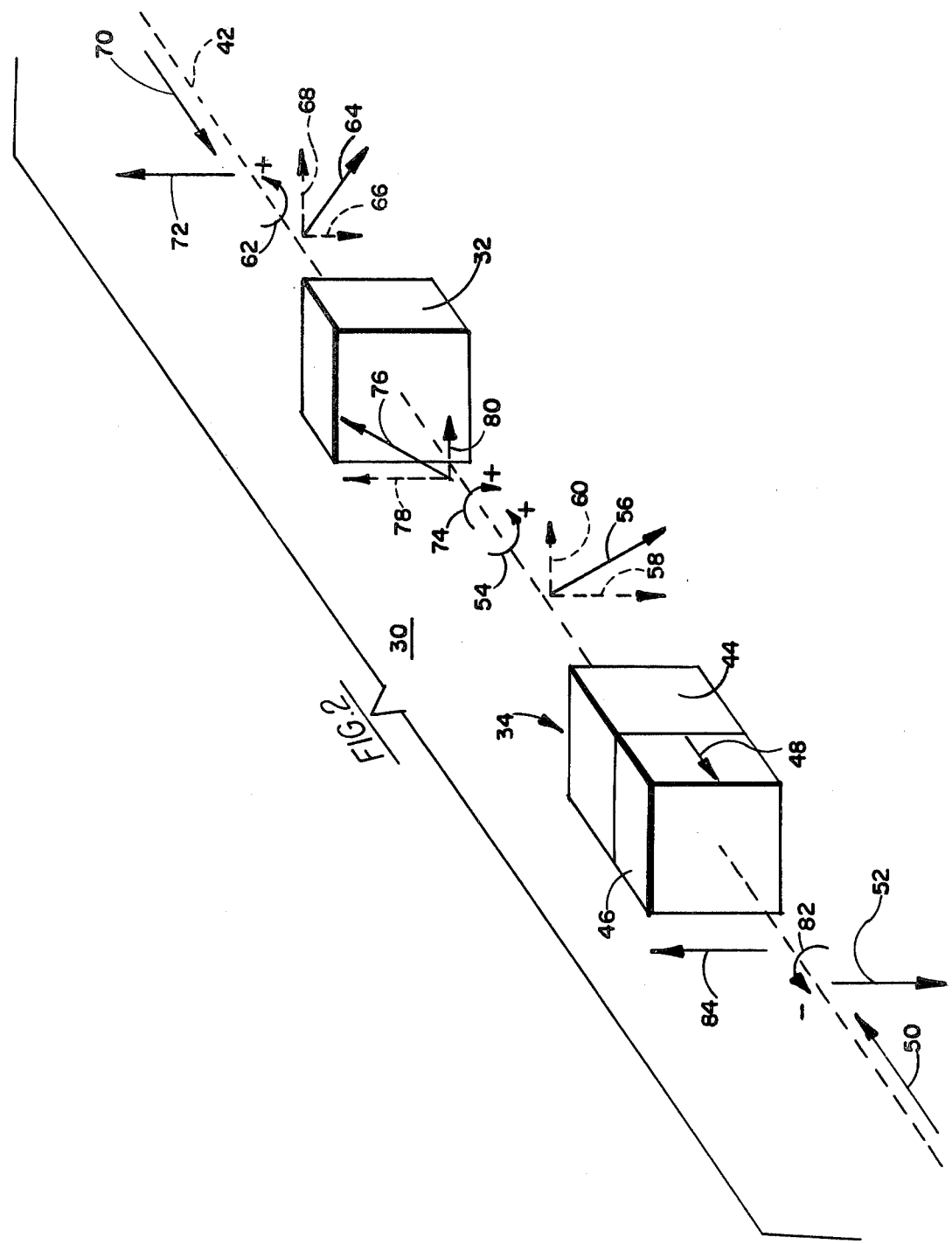

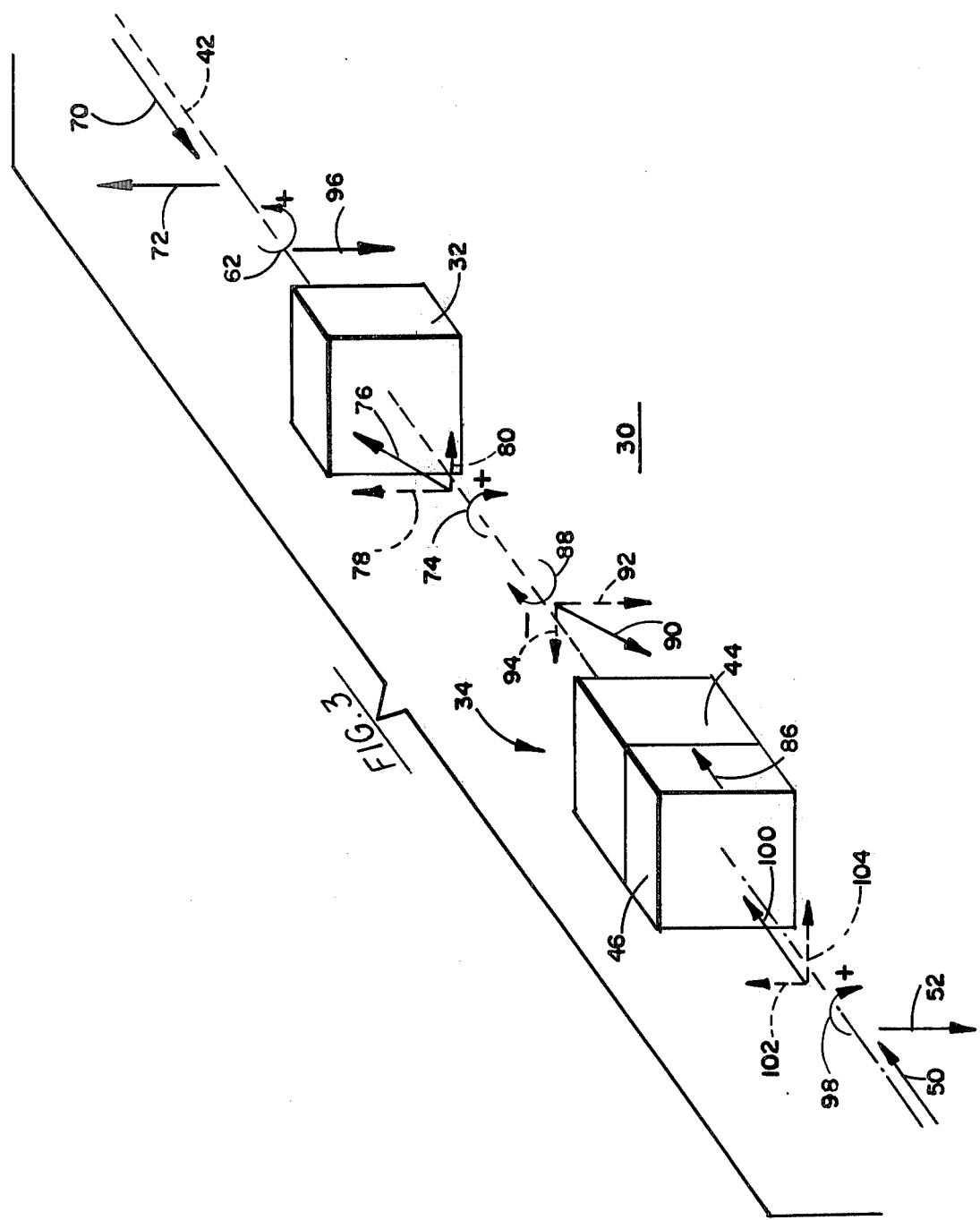

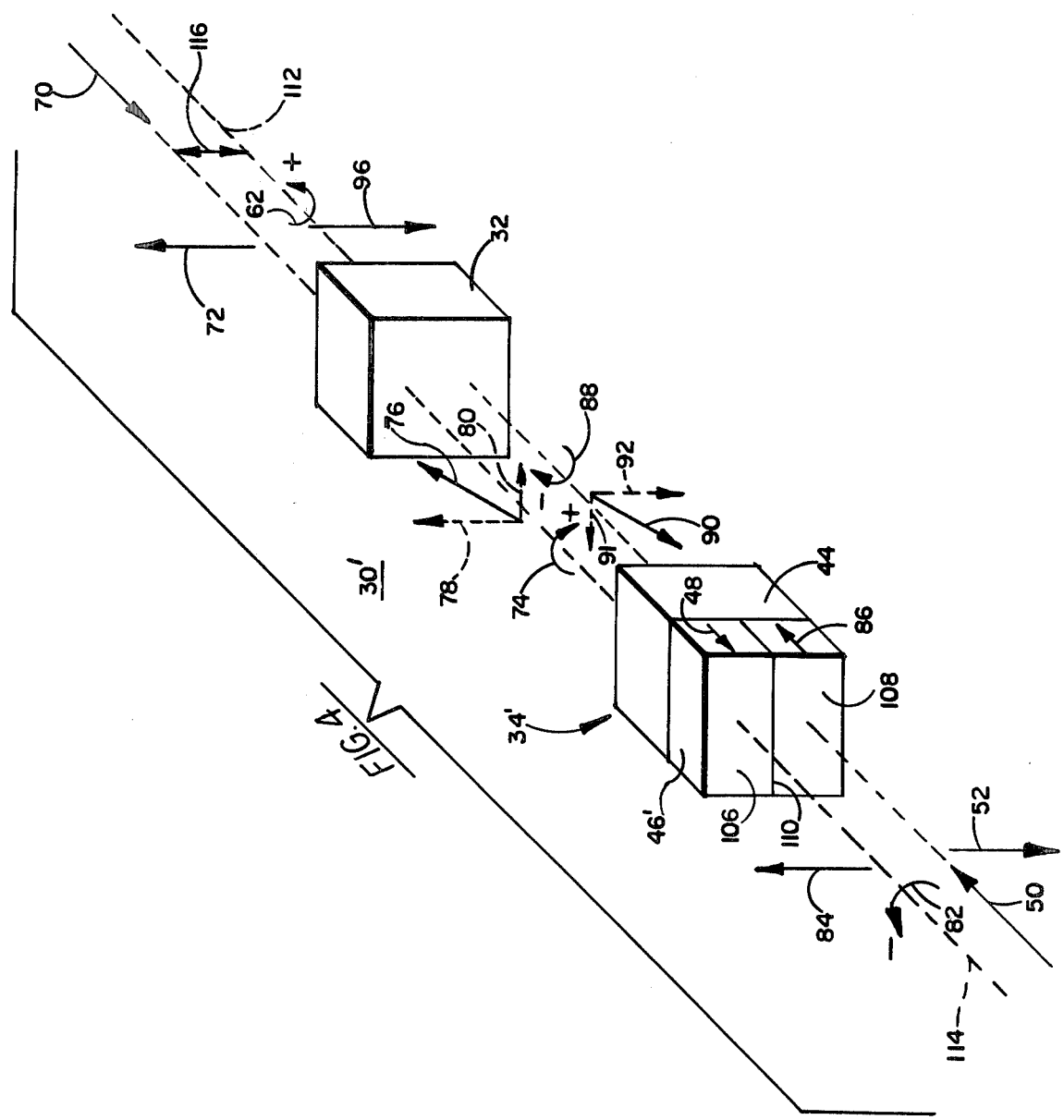

RING LASER HAVING MAGNETIC ISOLATION OF COUNTER-PROPAGATING LIGHT WAVES

BACKGROUND OF THE INVENTION

1. Field of the Invention

The present invention relates generally to ring lasers and more particularly to ring lasers which may be used as gyroscopes to sense rate of rotation. Most particularly, the invention relates to means in the optical cavity of the laser for isolating a pair of plane-polarized, counter-propagating light waves from each other to reduce the coupling between the light waves.

2. Description of the Prior Art

Ring lasers employing electromagnetic waves propagating at optical or near optical frequencies in clockwise and counterclockwise directions about a closed path in a principal plane have been used to sense rates of angular rotation. When this is the case, their function is similar to that of the well-known electromechanical gyro. The rotation of the laser causes a light wave propogating in the direction of rotation to take more time to complete the closed optical path while a light wave propagating in a direction opposite to the direction of rotation takes less times to complete the closed optical path. The increase and decrease in the time required to complete the path corresponds to an increase and decrease, respectively, in the effective length of the closed optical path in the optical cavity for the two light waves.

A basic requirement for sustaining laser oscillation is that the effective closed path length must be an integral number of wavelengths. Consequently, in the presence of rotation, the frequency of each of the counter-propagating light waves must shift to maintain the number of wavelengths in the effective path for each wave an integer. The frequencies of the two waves are then unequal by a difference which is proportional to the rotation rate of the laser.

A problem encountered in the prior art is that the two counter-propagating waves tend to mode lock; that is, for very low differences in the two frequencies, the two waves interfere, or couple, with one another and each assumes a frequency which is identical to the other. This effectively results in a deadband for low angular rates of the gyro. The coupling and consequent mode locking of the two waves is primarily the result of residual backscattering of light from the three or four mirrors which typically define the closed optical path. For example, light from the counterclockwise propagating wave which is backscattered from a corner reflector is ordinarily collinear with the clockwise propagating wave. Similarly, light from the clockwise propagating light wave which is backscattered from a corner reflector, for example, is ordinarily collinear with the counterclockwise propagating wave. Under these conditions, the tendency for mode locking is strongest.

For a description of an improved laser mirror having a reduced tendency to cause backscattering, see U.S. Pat. No. 4,101,707 issued July 18, 1978, to the inventor herein and assigned to Rockwell International Corporation, the assignee herein.

In order to overcome the nonlinearity resulting from mode locking, various means have been employed to bias the laser so as to maintain a frequency difference in excess of that at which mode locking can occur. Laser gyros known to the art commonly employ mechanical rotation or Faraday effect bias to separate the frequencies of counter-propagating laser waves sufficiently to prevent mode locking between the waves, particulary at low rotation rates. Periodic reversal of the bias is employed to minimize sensitivity to bias fluctuations and to provide partial cancellation of mode pulling and backscatter errors. The mechanical bias technique is undesirable from the standpoint of employing moving parts sensitive to the stresses of high acceleration. The Faraday bias method appears more desirable in this respect, but suffers from sensitivity to external magnetic fields and to possible bias reversal asymmetry.

SUMMARY OF THE INVENTION

The invention provides a ring laser having a reduced dead zone. The range of rotation rate for which mode locking of counter-propagating light waves occurs for light waves which share the same optical cavity and the same light amplifying means is correspondingly reduced. To obtain this, the present invention provides a unique optical isolator disposed in the optical cavity of the ring laser which reduces the extent to which a pair of plane, or linearly, polarized counter-propagating light waves couple and interact with each other in the laser gain medium.

The optical isolator is a bipolar, nonreciprocal loss element which induces significantly more rotation of the plane of polarization of a light wave propagating in one direction than it does in a similarly polarized light wave propagating in the opposite direction. In one embodiment, the nonreciprocal loss element produces a spatial displacement between the pair of light waves. In another embodiment, the nonreciprocal loss element cyclically permits first one and then the other of the pair of light waves to propagate around the closed optical path of the laser. The two waves cannot exist simultaneously in this case. There is thus produced a separation, or isolation, either spatial or temporal, between the two light waves.

The optical cavity of a laser in accordance with this invention is polarization selective. That is to say that the optical cavity exhibits a minimum, relatively low cavity loss for plane-polarized light having a selected orientation for its plane of polarization and appreciably greater cavity loss for plane-polarized light having a plane of polarization orthogonal to the selected polarization orientation.

The bipolar, nonreciprocal loss element comprises an optical element having reciprocal optical activity and a bipolar optical element having reversed or reversible nonreciprocal optical activity. When the effect of these two optical elements is appropriately combined, one of the pair of plane-polarized light waves, otherwise capable of simultaneously counter-propagating in the optical cavity, has its plane of polarization rotated sufficiently so that the optical cavity loss for this light wave exceeds the gain of the light amplifying means. Therefore, oscillation for the wave having the rotated polarization orientation is not sustained.

In a first embodiment of this invention, the clockwise propagating light wave, for example, is extinguished in a first portion of the aperture of the optical cavity having a first magnetic polarity for the bipolar, nonreciprocal, optically active element, while the counterclockwise propogating light wave is extinguished in a second portion of the aperture of the optical cavity having a second, reversed magnetic polarity for the bipolar, nonreciprocal, optically active element. In a second embodiment of this invention, each of the clockwise and counterclockwise propagating light waves are alternately extinguished for successive half periods of a cyclic reversal of the magnetic polarity for the entire bipolar, nonreciprocal, optically active element.

BRIEF DESCRIPTION OF THE DRAWINGS

FIG. 2 is a diagrammatic sketch, in perspective, of a bipolar nonreciprocal loss element having a bipolar, nonreciprocal, optically active element uniformly magnetized in a first direction and showing changes in polarization orientation for counter-propagating light waves.

FIG. 3 is a diagrammatic sketch, in perspective, of the same bipolar, nonreciprocal loss element shown in FIG. 2 but having the uniform magnetization of its bipolar, nonreciprocal, optically active element reversed from that of FIG. 2 and showing corresponding changes in polarization orientation for counter-propagating light waves.

FIG. 4 is a diagrammatic sketch, in perspective, of a bipolar, nonreciprocal loss element having a bipolar, nonreciprocal, optically active element with a magnetization, or domain, reversal in the optical cavity and showing changes in polarization orientation for counter-propagating light waves.

DESCRIPTION OF THE PREFERRED EMBODIMENTS

Figure 1:
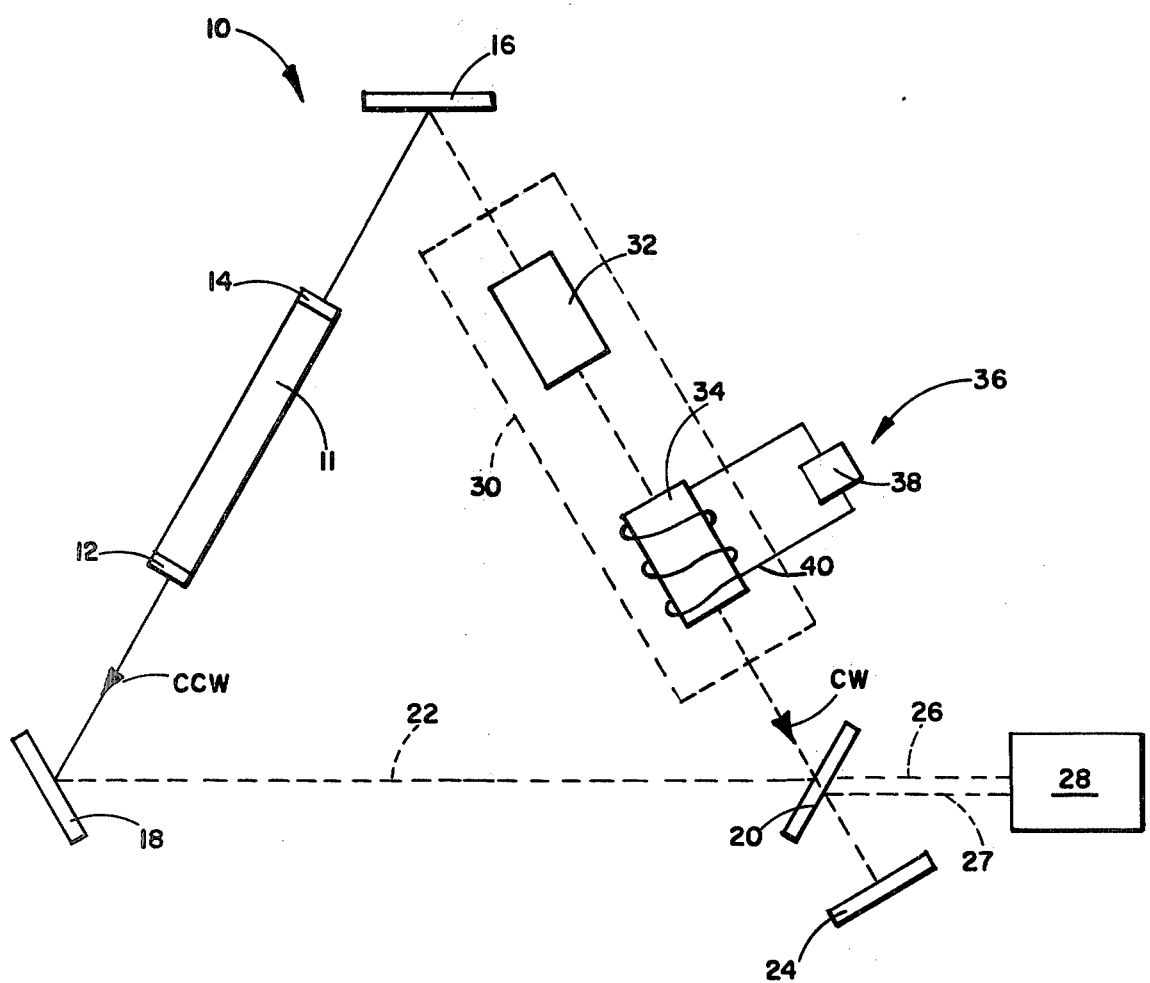
FIG. 1 is a schematic diagram of a ring laser incorporating means for magnetically isolating counter-propagating light waves in accordance with the present invention.

Throughout the figures, like or similar reference numerals designate the same or similar parts, lines, orientations, and rotations.

Referring to FIG. 1, a ring laser, indicated generally at 10, includes an active lasing medium, such as the standard helium-neon gas mixture energized by conventional r.f. means (not shown), contained within glass tube 11. The plasma in tube 11 emits light waves in both directions along its longitudinal axis through transmissive Brewster windows 12 and 14 sealing both ends of the tube 11. Optical cavity forming corner reflectors 16, 18 and 20 successively reflect the counter-propagating light waves around a closed optical path 22.

In the preferred embodiment of this invention, the optical cavity is polarization selective. At least a portion of the optical cavity has a preferred polarization orientation for the propagation of plane-polarized light. That is, for a particular selected orientation of the plane of polarization of a light wave, losses in a polarization-selective optical cavity, or a part thereof, are at a minimum. In the typical case, losses will be at a maximum in a polarization-selective optical cavity, or a part thereof, for plane-polarized light having a polarization orientation orthogonal to the selected orientation. Techniques for fabricating optical cavities which are polarization selective for either P-polarized light or for S-polarized light are well known to those skilled in the art.

For P-polarized light, the plane of polarization is coincident with, or is parallel to, the reference plane for the ring laser 10. The reference plane, as the term is used herein, is the plane of the optical cavity and the closed optical path 22 defined by the optical cavity. Equivalently, the reference plane is the plane normal to the axis about which a ring laser gyro such as the ring laser 10 measures rotation rate.

For S-polarized light, the plane of polarization is a plane which contains a segment of the optical path 22 and is orthogonal to the reference plane of the ring laser 10. It is well known, for example, that polarization selectivity for S-polarized light can be achieved by using a multilayer dielectric laser mirror for a corner reflection such as the corner reflector 16. This is so because multilayer dielectric laser mirrors tend to be selectively reflective. That is, they are more reflective for S-polarized light than for P-polarized light.

Reflector 20 is preferably partially transmissive, for example 5% transmissive (or lossy), in order to provide an exit port for light energy circulating in the optical loop 22. Reflector 24, which is positioned at right angles to the direction of the path from reflector 16 to reflector 20, represents means for causing light energy derived from a pair of similarly polarized light waves counter-propagating an optical path 22 to exit along parallel paths as shown at 26 and 27.

At a receiver 28, light energy from the pair of light waves is detected and processed to determine their difference in frequency. This may be done, for example, by mixing the two light waves to obtain an electrical signal at their beat, or difference, frequency. The electrical signal is then detected and its pulses are counted to give a proportional measure of the rotation rate of the optical cavity.

The above-described approach to processing the light waves on optical paths 26 and 27 in the receiver 28 is an appropriate one for the case where both of the light waves are incident upon the light detector or detectors (not shown) of the receiver 28 simultaneously. This condition corresponds to a preferred embodiment of this invention which will be discussed more fully hereinafter in connection with FIG. 4. However, in another preferred embodiment of this invention, the two light waves of the pair of similarly polarized, counter-propagating light waves are not present simultaneously on optical paths 26 and 27. Rather, they are present cyclically in alternating time intervals. This alternative embodiment of the invention is discussed more fully hereinafter in connection with FIGS. 2 and 3.

For the case in which the two light waves of the pair of similarly polarized, counter-propagating light waves are present in alternate time cycles on optical paths 26 and 27, the two light waves are more appropriately processed separately in receiver 28 to reach an intermediate stored result. This may be done, for example, by including in receiver 28 an independently operating laser (not shown) having a lasing medium similar to the one used in plasma tube 11 of the ring laser 10. Light emitted from this independent laser may be mixed separately with each of the two light waves incident on the detectors of receiver 28 to obtain individual electrical signals at a beat frequency for each of them. Each beat frequency signal may be independently processed to determine its frequency, the result may be stored, and then the two stored results may be combined to produce a signal or count proportional to the rotation rate of ring laser 10.

A bipolar, nonreciprocal loss element 30 in accordance with the invention is positioned in the optical cavity of the ring laser 10 of FIG. 1 to produce a separation or isolation between the pair of similarly polarized, counter-propagating light waves transmitted through element 30. The bipolar, nonreciprocal loss element 30 includes a reciprocal, optically active element 32 and a bipolar, nonreciprocal, optically active element 34. The bipolar, nonreciprocal loss element 30 is an optical isolator which operates on the counter-propagating light waves in the optical cavity to rotate the plane of polarization of a selected one of the pair of light waves in at least a part of the aperture of the optical cavity. The changed polarization orientation of the selected light wave, as produced by this rotation, is no longer at the preferred, or least lossy, polarization orientation for the optical cavity. Therefore, losses for the selected light wave are increased.

In the preferred embodiment of this invention, the gain of the active lasing medium in plasma tube 11 is selected, or adjusted, so that a relatively small rotation of the plane of polarization of the selected light wave is sufficient to prevent lasing, or sustained propagation, of that wave. The selected light wave is thereby extinguished in that part of the aperture of the optical cavity in which its polarization orientation tends to be rotated away from the preferred polarization orientation of the optical cavity.

The operation of bipolar, nonreciprocal loss element 30, which will be discussed in more detail hereinafter, will typically affect the polarization orientation of both of the pair of similarly polarized, counter-propagating light waves. The essential point, however, is that the polarization orientation of the selected light wave only is rotated enough so that the increased losses are sufficient to prevent lasing of that wave. The polarization orientation of the other one of the pair of similarly polarized, counter-propagating light waves may be changed also, but not so much that lasing of that light wave is not sustained at the chosen lasing medium gain.

In the preferred embodiments of this invention, the bipolar, nonreciprocal, optically active element 34 produces nonreciprocal rotation of the plane of polarization of plane-polarized light waves transmitted through it by operation of the well-known Faraday effect. This effect is dependent upon the presence of a magnetic field along the direction of propagation. In some embodiments, the requisite magnetic field may be provided by permanently magnetized material in element 34. That is the case for the embodiment discussed more fully hereinafter in connection with FIG. 4. In other cases, an external source for applying the magnetic field is required. That is the case for the embodiment discussed more fully hereinafter in connection with FIGS. 2 and 3. Therefore, to accommodate the embodiment of FIGS. 2 and 3, there is shown in FIG. 1 means 36 for applying a magnetic field along that part of optical path 22 which passes through the bipolar, nonreciprocal, optically active element 34. Magnetic field means 36 comprises an energy source 38 and a magnetic coil 40 connected to energy source 38. Magnetic coil 40 surrounds optical element 34. Energy source 38 may include means for cyclically reversing the magnetic field produced by the current in the coil 40.

The bipolar, nonreciprocal loss element 30, as illustrated in FIG. 2, comprises reciprocal, optically active element 32 and bipolar, nonreciprocal, optically active element 34.

As used herein, the term optical activity refers to that property of certain materials which produces rotation of the plane of polarization of plane-polarized light transmitted through such materials.

Optical activity is reciprocal when the rotation produced is the same for transmission in opposite directions. Stated alternatively, optical activity is reciprocal when the rotation produced by transmission through the material in one direction is cancelled by reflecting the light wave back through the material in the opposite direction.

Crystals of quartz and bismuth germanium oxide, twisted nematic liquid crystal materials, liquid solutions of sugar, and liquid and vaporous turpentine are examples of the materials which are known to exhibit reciprocal optical activity.

Optical activity is nonreciprocal when the rotation of the plane of polarization of a plane-polarized light wave is different for transmission in opposite directions. Stated alternatively, optical activity is nonreciprocal when the rotation produced by transmission through the material in one direction is doubled by reflecting the light wave back through the material in the opposite direction.

Materials which exhibit the Faraday effect in the presence of a magnetic field along the direction of light transmitted through the materials are nonreciprocal, optically active materials. The Faraday effect has been observed in many solids, liquids, and gases. Quartz crystals have often been used as Faraday rotators in ring lasers. The ferrimagnetic materials such as the magnetic garnets, the hexagonal ferrites, and the orthoferrites are suitable for use in nonreciprocal, optically active elements.

A ring laser which employs a composite Faraday element comprising a monocrystalline thin film of a ferrimagnetic material epitaxially deposited on a nonmagnetic single crystal substrate is disclosed in copending U.S. patent application Ser. No. 880,408 filed Feb. 23, 1978, by the applicant herein and assigned to the assignee of this application. The disclosure of said copending application is hereby incorporated by reference into the present specification in its entirety for the detailed description of the composite Faraday element given there including such aspects of the element as the composition of the various materials and measures taken to reduce or eliminate reflections from boundaries between layers of dissimilar materials in the element. The Faraday element disclosed in said copending application is the preferred implementation for a bipolar, nonreciprocal, optically active element for use in practicing the invention described herein.

The fabrication of the type of Faraday element preferred for use in this invention is discussed in a paper by Whitcomb et al, "Fabrication of Thin Film Magnetic Garnet Structures For Intra-Cavity Laser Applications," Proceedings, 23rd Conference on Magnetism and Magnetic Materials, Minneapolis, Minn., Nov. 8–11, 1977. Said paper is hereby incorporated by reference into the present specification in its entirety. Said paper also appears in the Journal of Applied Physics, 49(3) p. 1903, March 1978.

FIG. 2 is an exploded view of a reversible, bipolar nonreciprocal loss element 30 disposed in the optical cavity of ring laser 10 of FIG. 1. Loss element 30 fills the aperture of the optical cavity; substantially all of the light propagating in the optical cavity is transmitted through loss element 30.

In FIG. 2, reciprocal, optically active element 32 may be, for example, a piece of single-crystal quartz having its C-axis aligned along the line of propagation of the pair of counter-propagating light waves as represented by dashed line 42. Bipolar, nonreciprocal, optically active element 34 comprises a nonmagnetic, single-crystal substrate 44 and a thin film 46 of a monocrystalline, ferrimagnetic material epitaxially deposited on the substrate 44.

Thin film 46, as shown in FIG. 2, is uniformly magnetized in the direction indicated by arrow 48 parallel to line-of-propagation 42. This uniform magnetization may be produced, for example, by the magnetomotive force of magnetic field means 36 as illustrated in FIG. 1. The amount of magnetomotive force is preferably significantly greater than that which is required to saturate the film 48 in order to minimize the effects of stray magnetic fields such as, for example, the earth's field.

A clockwise propagating light wave, as represented by arrow 50 in FIG. 2, is plane-polarized in the vertical plane containing line of propagation 42 as indicated by the arrow 52. In this specification, the vertical plane is taken to be the preferred plane of polarization for the optical cavity. The vertical plane may be the reference plane, as discussed above, or the plane orthogonal to the reference plane. After propagating through bipolar, nonreciprocal, optically active element 34, the plane of polarization of the clockwise propagating light wave 50 is rotated in the positive direction, for example, as indicated by curved arrow 54. The new plane of polarization resulting from this rotation is indicated by the arrow 56 having components 58 and 60 in the preferred plane and the plane orthogonal to the preferred plane, respectively.

After propagating farther through reciprocal, optically active element 32, the plane of polarization of clockwise propagating light wave 50 is rotated an additional amount in the positive direction, for example, as indicated by curved arrow 62. The new plane of polarization resulting from this additional rotation is indicated by the arrow 64 having components 66 and 68 in the preferred plane of the optical cavity and the plane orthogonal to the preferred plane, respectively. This rotation of the plane of polarization of clockwise propagating light wave 50 introduces sufficient loss into the ring laser system to cause light wave 50 to be extinguished.

It will be recognized by those skilled in the art that the angles of rotation for the planes of polarization are exaggerated in size in FIG. 2, and in the subsequent figures, for the sake of illustration. Typically, a small loss in the range of from about 2% to about 5% is sufficient to inhibit lasing of the affected light wave. Stated alternatively, the gain of the active lasing medium in tube 11 of FIG. 1 is either selected or adjusted to be at a value which is insufficient to sustain the oscillation, or propagation, of clockwise propagating light wave 50 for the combined amount of change of polarization orientation produced by both reciprocal, optically active element 32 and bipolar, nonreciprocal, optically active element 34. Therefore, in the example shown in FIG. 2, clockwise propagating light wave 50 is extinguished in the entire aperture of the optical cavity.

On the other hand, the counterclockwise propagating light wave, as represented by arrow 70 in FIG. 2, receives little or no rotation of its plane of polarization by reason of its transmission through bipolar, nonreciprocal loss element 30. The initial polarization of light wave 70 in the vertical plane containing line of propagation 42 is indicated by the arrow 72. After propagating through reciprocal, optically active element 32, the plane of polarization of the counterclockwise propagating light wave 70 is rotated in the positive direction as indicated by curved arrow 74.

The new plane of polarization resulting from this rotation is indicated by the arrow 76 having components 78 and 80 in the preferred plane and the plane orthogonal to the preferred plane, respectively.

After propagating farther through bipolar, nonreciprocal, optically active element 34, the plane of polarization of counterclockwise propagating light wave 70 is rotated in the negative direction as indicated by curved arrow 82. This negative rotation substantially cancels the positive rotation produced by reciprocal, optically active element 32. The resultant orientation of the plane of polarization of light wave 70 as indicated by the arrow 84, is substantially in the preferred plane for the optical cavity.

The bipolar, nonreciprocal loss element 30 shown in FIG. 2 produces little or no rotation of the plane of polarization of counterclockwise propagating wave 70 and thus little or no loss for that wave. Stated alternatively, the loss introduced by loss element 30 for light wave 70 is insufficient to extinguish the wave or prevent sustained oscillation.

FIG. 3 is the same exploded view of the reversible, bipolar, nonreciprocal loss element 30 shown in FIG. 2. The difference is that, in FIG. 3, the polarity of the uniform magnetization of thin film 46, as indicated by the arrow 86, has been reversed from that of FIG. 2 as indicated by the arrow 48. With this polarity reversal, it is counterclockwise propagating light wave 70 which receives cumulative changes in polarization orientation from reciprocal, optically active element 32 and bipolar, nonreciprocal, optically active element 34 and is thereby extinguished. Clockwise propagating light wave 50 receives substantially equal and opposite polarization rotations with a resultant loss insufficient to prevent oscillation and sustained propagation.

The initial polarization of clockwise propagating light wave 50 in the preferred plane is indicated in FIG. 3 by the arrow 52. The negative rotation of the plane of polarization of light wave 50 by bipolar, nonreciprocal, optically active element 34 is indicated in FIG. 3 by curved arrow 88. The new plane of polarization resulting from this rotation is indicated by the arrow 90 having components 92 and 94 in the preferred plane and the plane orthogonal to the preferred plane, respectively.

After propagating farther through reciprocal, optically active element 32, the plane of polarization of clockwise propagating light wave 50 is rotated back in the positive direction as indicated by curved arrow 62. This positive rotation substantially cancels the negative rotation produced by bipolar, nonreciprocal, optically active element 34. The resultant orientation of the plane of polarization of light wave 50, as indicated by the arrow 96, is substantially in the preferred plane for the optical cavity.

The initial polarization of counterclockwise propagating light wave 70 is indicated in FIG. 3 by the arrow 72. The positive rotation of the plane of polarization of light wave 70 by reciprocal optically active element 32 is indicated in FIG. 3 by curved arrow 74. The new plane of polarization resulting from this rotation is indicated by the arrow 76 having components 78 and 80 in the preferred plane and the plane orthogonal to the preferred plane, respectively.

After propagating farther through bipolar, nonreciprocal, optically active element 34, the plane of polarization of counterclockwise propagating light wave 70 is rotated an additional amount in the positive direction as indicated by curved arrow 98. The new plane of polarization resulting from this additional rotation is indicated by the arrow 100 having components 102 and 104 in the preferred plane of the optical cavity and the plane orthogonal to the preferred plane, respectively. This rotation of the plane of polarization of counterclockwise propagating light wave 70 introduces sufficient loss into the ring laser system to cause light wave 70 to be extinguished.

Thus, it has been shown, in the discussion above accompanying FIGS. 2 and 3, that the bipolar, nonreciprocal loss element 30 described in those figures prevents the simultaneous propagation of the pair of similarly polarized, counter-propagating light waves 50 and 70. By cyclically alternating the direction of the current supplied by energy source 38 to the magnetic coil 40, magnetic field means 36, as shown in FIG. 1, produces a cyclically reversing polarity of the magnetization in the layer of nonreciprocal, optically active material 46. As a result, each one of the pair of light waves 50 and 70 is cyclically allowed to propagate and is extinguished alternately during successive intervals of time. The pair of light waves 50 and 70, since they are not present at the same time, are temporally isolated from each other and no coupling between them can occur. Therefore, mode locking is avoided entirely in this embodiment of the invention.

FIG. 4 is an exploded view of a bipolar, nonreciprocal loss element 30' disposed in the optical cavity of ring laser 10 of FIG. 1. FIG. 4 shows an alternative embodiment of the subject invention wherein a spatial rather than temporal separation of a pair of similarly polarized, counter-propagating light waves is obtained. Whereas in the embodiment of FIGS. 2 and 3, both light waves 50 and 70 propagate along the same segmented linear path at different times, in the embodiment of FIG. 4, the clockwise propagating and counterclockwise propagating light waves simultaneously propagate along similar segmented linear paths which are displaced in space from each other.

The bipolar, nonreciprocal loss element 30' of FIG. 4 fills the aperture of the optical cavity; substantially all of the light propagating in the optical cavity is transmitted through loss element 30'.

In FIG. 4, reciprocal, optically active element 32 is preferably the same in construction and operation as the element 32 described in connection with FIGS. 2 and 3. Bipolar, nonreciprocal, optically active element 34', comprising a nonmagnetic, single-crystal substrate 44 and a thin film 46' of a monocrystalline, ferrimagnetic material epitaxially deposited on the substrate 44, is similar in construction and operation to the element 34 described in connection with FIGS. 2 and 3. However, element 34' differs from element 34, in one important respect. The thin film 46' of ferrimagnetic material of element 34 is not uniformly magnetized but rather has at least one magnetization reversal 110, or domain wall, separating oppositely magnetized domains 106 and 108. The directions of magnetization for domains 106 and 108 are along line of propagation 112 for clockwise propagating light wave 50 and along line of propagation 114 for counterclockwise propagating light wave 70, respectively, as indicated by the arrows 86 and 48.

Although FIG. 4 shows two oppositely magnetized domains 106 and 108 in thin magnetic film 46', this number is given by way of example only. Any number of oppositely magnetized domains may be implemented. However, it is desirable that the domains having each polarity of the two opposing magnetization polarities occupy approximately half the area of the aperture of the optical cavity.

The upper half of bipolar, nonreciprocal, optically active element 34', as shown in FIG. 4, produces a result similar to that depicted in FIG. 2. Counterclockwise propagating light wave 70 propagating along dashed line 114 receives substantially cancelling rotations of its polarization orientation in the upper half of the aperture. Its propagation is therefore sustained. A clockwise propagating light wave would receive cumulative rotations of its polarization orientation in the upper half of the optical cavity and be extinguished.

At the same time, the lower half of bipolar, nonreciprocal optically active element 34', as shown in FIG. 4, produces a result similar to that depicted in FIG. 3. Clockwise propagating light wave 50 propagating along dashed line 112 receives substantially cancelling rotations of its polarization orientation in the lower half of the aperture. Its propagation is therefore sustained. A counterclockwise propagating light wave would receive cumulative rotations of its polarization orientation in the lower half of the optical cavity and be extinguished.

The result is that the embodiment of the subject invention depicted in FIG. 4 produces a displacement in space, as indicated by double-ended arrow 116, between the beams of the pair of similarly polarized, counter-propagating light waves 50 and 70. The optical path is separated into at least two distinct parts as represented by dashed lines 112 and 114. Backscattering of, for example, clockwise propagating light wave 50 from a corner reflector such as, for example, corner reflector 16 in FIG. 1, cannot be collinear with counterclockwise propagating light wave 70 due to the separation between the paths. Coupling between the pair of counter-propagating light waves is thereby greatly reduced. A correspondingly great reduction in the nonlinear mode locking region is thereby obtained.

Thus, it has been shown, in the discussion above accompanying FIG. 4, that the bipolar, nonreciprocal loss element 30' described in that figure prevents the collinear propagation of the pair of similarly polarized, counter-propagating light waves 50 and 70. The domain wall, or magnetic reversal, 110 separating regions of opposite magnetization is appropriately positioned in the aperture of the optical cavity by means of one or more magnetized pieces of permalloy material (not shown) which are affixed to the bipolar, nonreciprocal, optically active element 34'. This approach to fixing the position of a domain wall in a magnetic film is widely used in bubble memory technology.

It will be recognized by those skilled in the art that the rectangular shape for the individual domains 106 and 108 in FIG. 4 is illustrative only. The domains may be given any other convenient shape such as, for example, concentric circles. It will also be recognized by those skilled in the art that the use of terms such as "upper", "lower", "vertical", and "horizontal" in the description of portions of the optical cavity and the bipolar, nonreciprocal, optically active element 34' as shown in FIG. 4 is for convenience of description only. No particular relative placement of the domains 106 and 108 is required for the proper functioning of the invention.

In each of FIGS. 2, 3, and 4, the illustrations of optical elements 32, 34 and 34' are intended to represent only those portions of those elements which are in the bore, or aperture, of the optical cavity. Those skilled in the art will recognize that actual implementations of these elements may include structure which extends outside the optical cavity. A piece of permalloy material used to determine the position of domain wall 110, for example, is preferably placed on or near magnetic film 46' at a point on optical element 34' which is external to the optical cavity.

For the sake of illustration, the example of optically active material used in optical element 32 of FIGS. 2, 3 and 4 was chosen to be one which exhibits positive specific rotation. Those skilled in the art will recognize that the invention can be made to work equally well using material exhibiting negative specific rotation. Equivalently, the functioning of the invention is not dependent on the particular directions of rotation of the planes of polarization chosen in the illustrations of FIGS. 2, 3 and 4 for the function of optical elements 34 and 34'.

It should be understood, of course, the foregoing disclosure relates only to preferred embodiments of the invention and that numerous modifications may be made therein without departing from the spirit and scope of the invention as set forth in the appended claims.

What is claimed is:

1. A ring laser comprising:
   means for defining an optical cavity on a closed optical path;
   light amplifying means disposed in said optical cavity for sustaining counter-propagation around said closed optical path of at least one pair of similarly polarized light waves; and
   bipolar, nonreciprocal loss element means for preventing simultaneous collinear propagation of said pair of light waves on said closed optical path.

2. A ring laser as recited in claim 1 wherein said optical cavity is polarization selective because a minimum amount of gain from said light amplifying means is required to sustain the propagation in said optical cavity of plane-polarized light having a selected polarization orientation relative to a reference plane for said ring laser,
   wherein the gain of said light amplifying means is selected to be sufficient to sustain the propagation in said optical cavity of light waves having said selected polarization orientation, and
   wherein the gain of said light amplifying means is selected to be insufficient to sustain the propagation in said optical cavity of light waves having a polarization orientation orthogonal to said selected polarization orientation.

3. A ring laser as recited in claim 2 wherein said bipolar, nonreciprocal loss element means produces sufficient rotation of the planes of polarization of said pair of counter-propagating, similarly polarized light waves to prevent said pair of light waves from propagating simultaneously and collinearly on said closed optical path.

4. A ring laser as recited in claim 2 wherein said bipolar, nonreciprocal loss element means comprises reciprocal, optically active element means for producing the same rotation of the plane of polarization of a plane-polarized light wave propagating on said closed optical path through said reciprocal, optically active element means regardless of the direction of propagation on said closed optical path of said plane-polarized light wave.

5. A ring laser as recited in claim 4 wherein said reciprocal, optically active element means comprises a layer of reciprocal, optically active material disposed in the aperture of said optical cavity.

6. A ring laser as recited in claim 2 wherein said bipolar, nonreciprocal loss element means comprises bipolar, nonreciprocal, optically active element means for producing equal and opposite rotations of the planes of polarization of similarly plane-polarized light waves counter-propagating collinearly on said closed optical path through said bipolar, nonreciprocal, optically active element means.

7. A ring laser as recited in claim 6 wherein said bipolar, nonreciprocal, optically active element means comprises a layer of nonreciprocal, optically active material disposed in the aperture of said optical cavity.

8. A ring laser as recited in claim 7 wherein said layer of nonreciprocal, optically active material has at least two oppositely magnetized domains.

9. A ring laser as recited in claim 8 wherein the directions of magnetization of said at least two oppositely magnetized domains are substantially parallel and substantially antiparallel to said closed optical path.

10. A ring laser as recited in claim 7 wherein said layer of nonreciprocal, optically active material is a film of ferrimagnetic material selected from the group consisting of magnetic garnets, hexagonal ferrites, and orthoferrites.

11. A ring laser as recited in claim 8 wherein said bipolar, nonreciprocal loss element means causes a first one of said pair of counter-propagating, similarly polarized light waves to propagate along a first portion of said optical path through a first one of said at least two oppositely magnetized domains disposed in said aperture of said optical cavity and
    causes a second one of said pair of counter-propagating, similarly polarized light waves to propagate along a second portion of said optical path through a second one of said domains having a direction of magnetization opposite to that of said first domain
    whereby said first and second counter-propagating, similarly polarized light waves counter-propagate simultaneously on spatially separated portions of said optical path.

12. A ring laser as recited in claim 8 wherein said bipolar, nonreciprocal loss element means produces sufficient rotation of the plane of polarization of a first one of said pair of counter-propagating, similarly polarized light waves to prevent said first light wave from propagating on a portion of said optical path passing through a first one of said at least two oppositely magnetized domains and
    wherein said bipolar, nonreciprocal loss element means produces sufficient rotation of the plane of polarization of a second one of said pair of counter-propagating, similarly polarized light waves to prevent said second light wave from propagating on a portion of said optical path passing through a second one of said domains wherein the magnetization of said second domain is opposite to the magnetization of said first domain
    whereby said first and second counter-propagating, similarly polarized light waves counter-propagate simultaneously on spatially separated portions of said optical path.

13. A ring laser as recited in claim 7 wherein said layer of nonreciprocal, optically active material is uniformly magnetized.

14. A ring laser as recited in claim 13 wherein said bipolar, nonreciprocal, optically active element means comprises means for cyclically reversing the polarity of the magnetization of said layer of nonreciprocal, optically active material from uniform magnetization in one direction to uniform magnetization in a direction substantially opposite to said one direction.

15. A ring laser as recited in claim 14 wherein said one direction of uniform magnetization and said opposite direction of uniform magnetization are substantially parallel and substantially antiparallel, respectively, to said closed optical path.

16. A ring laser as recited in claim 14 wherein said bipolar, nonreciprocal loss element means causes a first one only of said pair of counter-propagating, similarly polarized light waves to propagate in said optical cavity when said cyclically reversing polarity of magnetization is in said one direction and causes a second one only of said pair of counter-propagating, similarly polarized light waves to propagate in said optical cavity when said cyclically reversing polarity of magnetization is in said direction substantially opposite to said one direction whereby the propagation of each of said pair of counter-propagating, similarly polarized light waves is temporally separated from the propagation of the other light wave.

17. A ring laser as recited in claim 14 wherein said bipolar, nonreciprocal loss element means produces sufficient rotation of the plane of polarization of a first one of said pair of counter-propagating, similarly polarized light waves to prevent said first light wave from propagating in said optical cavity when said cyclically reversing polarity of magnetization is in said one direction and wherein said bipolar, nonreciprocal loss element means produces sufficient rotation of the plane of polarization of a second one of said pair of counter-propagating, similarly polarized light waves to prevent said second light wave from propagating in said optical cavity when said cyclically reversing polarity of magnetization is in said direction substantially opposite to said one direction whereby the propagation of each of said pair of counter-propagating, similarly polarized light waves is temporally separated from the propagation of the other light wave.

18. A method of isolating from each other, a pair of similarly polarized light waves counter-propagating on a closed optical path in a polarization selective optical cavity of a ring laser, said method comprising:

rotating the plane of polarization of a selected one of said pair of light waves sufficiently to cause propagation of said selected light wave to be prevented in at least a portion of the aperture of said optical cavity.

19. The method recited in claim 18, wherein said rotating step further comprises operating on said pair of light waves with a nonreciprocal loss element.

20. The method recited in claim 19, wherein said nonreciprocal loss element comprises:

a reciprocal, optically active element; and a bipolar, nonreciprocal, optically active element.

21. The method recited in claim 20, wherein said bipolar, nonreciprocal, optically active element has a first magnetic polarity in a first portion of the aperture of said optical cavity and a second, reversed magnetic polarity in a second portion of the aperture of said optical cavity.

22. The method recited in claim 20, wherein said rotating step further comprises cyclically reversing the magnetic polarity of said bipolar, nonreciprocal, optically active element.

* * * * *

UNITED STATES PATENT AND TRADEMARK OFFICE
CERTIFICATE OF CORRECTION

PATENT NO. : 4,219,275
DATED : August 26, 1980
INVENTOR(S) : Rodney D. Henry

It is certified that error appears in the above-identified patent and that said Letters Patent are hereby corrected as shown below:

Column 4, line 7, change "reflection" to read -- reflector --.
Column 6, line 55, change "1903" to read -- 1803 --.

Signed and Sealed this

Tenth Day of February 1981

[SEAL]

*Attest:*

RENE D. TEGTMEYER

*Attesting Officer*     *Acting Commissioner of Patents and Trademarks*